Oct. 3, 1950     P. J. CARPENTIER     2,524,039
PROCESS OF PRODUCING CELLULAR RUBBER
Filed April 30, 1947

INVENTOR
Pascal J. Carpentier
by John H. Graham
HIS ATTORNEY.

Patented Oct. 3, 1950

2,524,039

UNITED STATES PATENT OFFICE 2,524,039

PROCESS OF PRODUCING CELLULAR RUBBER

Pascal J. Carpentier, Paris, France

Application April 30, 1947, Serial No. 744,832
In France February 18, 1947

5 Claims. (Cl. 18—53)

With a view to obtain light weight materials from thermoplastic substances bodies have been produced having a cellular structure composed of open or closed globular cells.

In order to secure maximum strength and stability combined with minimum density in such a material it is necessary to obtain closed polyhedral cells with very thin plane or curved walls. In such a structure the partition common to two adjacent cells is very thin and has a uniform thickness. In contrast thereto, in a structure comprising globular cells, the wall between two adjacent cells is very thin at that point where they are nearly tangent and increases progressively in thickness with the distance from that point. This structure involves not only a decrease in the strength of the material at that point where the thickness of the partition is a minimum but also an increase in the specific weight of said material, while said material, if formed with closed polyhedral cells separated by throughout thin portions, would be improved as to its mechanical stability and strength although being lighter in weight.

The present invention is concerned with a method whereby, starting from natural or synthetic rubber or from similar substances, objects can be produced having a structure formed of polyhedral cells with extremely and uniformly thin plane or curved partitions, specific weight thereof being extremely reduced, in some instances down to about .04, and at the same time possessing satisfactory stability and strength properties.

The principle of the method of the present invention is to form a mixture of rubber or rubberlike materials with a gas evolving agent or mixture thereof and with plasticizers, dyes or like common ingredients to give desired properties to the finished product in known manner. The mass is prepared as a homogeneous mass and is then placed in a pressure vessel such as a mold or an autoclave. The mass is then heated to cause incipient vulcanizing and to evolve the generation of gas by means of the gas evolving agent or agents.

If desired, gas such as nitrogen may be introduced also from outside the mold to build up the pressure therein.

Referring now more specifically to the invention, a rubber mix similar to those usually employed in the rubber industry is mixed intimately with a substance capable of evolving an inert gas at a definite temperature as a result either of its decomposition or of its reaction with definite constituents of the mixture, care being taken to mix with as little air as possible occluded. The mixture is enclosed in a vessel under pressure, for example, an autoclave or a mold.

The mixture is then heated rapidly to a temperature of, say 110° C., whereby vulcanization of the mixture is initiated, and gas is evolved within the mixture. The gas cannot escape therefrom owing to the fact that vulcanization has already been initiated.

Due to the presence of the gas either evolved in a small-sized mold or in an autoclave, or evolved and introduced from externally thereof, the pressure in the vessel is raised to, say, 400 kg./cm.$^2$ The gas evolved and/or introduced into the autoclave disseminates finely and uniformly throughout the mixture.

By a quick yet controlled increase in the volume of the mixture plus occluded gas system, e. g. by reducing the pressure within the vessel, a correspondingly rapid displacement of the particles in said mixture is effected. As a result of these phenomena, closed polyhedral cells having uniformly thin plane or curved walls are formed by the gas within the mixture, in which the gas is still under pressure. Preferably, heating is prolonged for some minutes in order that due to the complemental vulcanization attending such heating the material may acquire the extensibility and the strength necessary for the subsequent operations.

The mixture is then cooled down to a temperature sufficient to prevent it from bursting out at stripping, and the pressure within the vessel is released. The vessel is opened and the rudimentary cellular body thus obtained is taken out. It is allowed to swell at normal pressure and temperature as a result of the presence therein of gas under pressure, and this is allowed to continue, until the gas pressure within the cells is counterbalanced by the resistance of the partition walls.

In order to complete the vulcanization of the swelled body the latter is enclosed in the full-size mold and heated therein to the desired temperature under a pressure of about 10 kg./cm.$^2$ By continued expansion the body fills the mold and is fixed in its shape by the vulcanization. A polyhedral cellular body is thus obtained which possesses the desirable shape, stability and strength.

For the vulcanization step the swelled body may be used as such; alternatively, it may be cut into pieces to be used individually. It may also be given a more delineated shape by using suitable molds.

In carrying this method into effect apparatus may be utilized which is described hereinafter by way of example, reference being made to the attached drawing in which.

Figure 1:
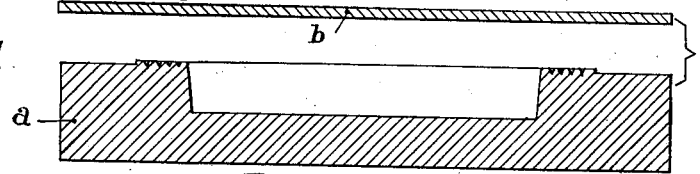
Figure 1 is a sectional view on an enlarged scale of a mold, according to the invention.
Figure 2:
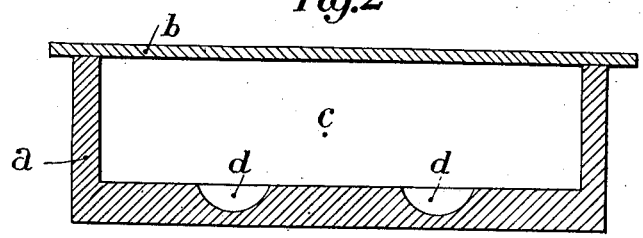
Figure 2 is a sectional view on an enlarged scale of another mold, according to the invention.
Figure 3:
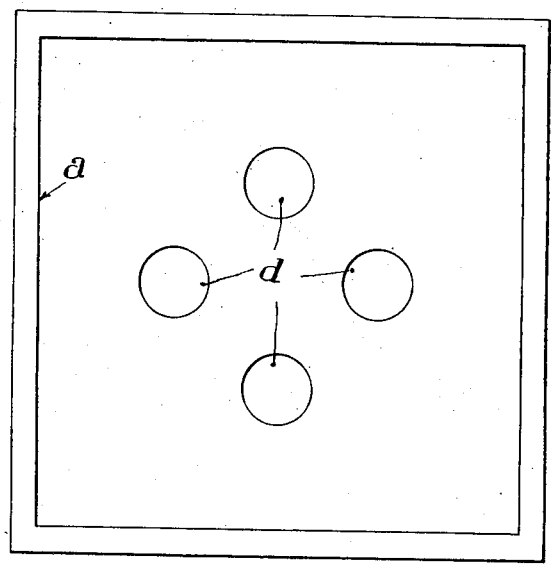
Figure 3 is a plan view of the mold of Figure 2 without its cover.

The mold $a$ illustrated in Fig. 1 is for the production of the cellular body embryo to be molded as a round plate in the cup $c$ and is closed by a cover $b$. The mold shown in Figs. 2 and 3 is for the vulcanization of a piece of the said cellular body embryo while molding it to its final shape and size, and is provided with recesses $d$.

By altering the quality of the rubber or rubbers used or their percentages in the mixture as well as those of the other constituents of the latter, or by varying the temperature, pressure and duration of the steps described hereinbefore, it is possible to obtain cellular bodies possessing widely different densities, hardnesses and general characters. Also for the same reasons, it is possible to add further substances such as pigments, plastic materials, fillers, plasticizers, vulcanizers, accelerators, as is well known in the art.

As an agent capable of evolving the inert gas within the mixture, azo-isobutyric acid dinitrile may advantageously be employed, or some other substance subject to decompose at a definite temperature while evolving gas. Preferably, the vulcanization process should already be initiated at the said temperature, as otherwise the gas would be liable to escape from the mixture as it is evolved by action of heat.

In order to obtain this result the crude rubber mix is prepared according to formulae known in the rubber industry in such manner that the gas may begin to evolve only after the vulcanization has already been initiated.

Generally, an autoclave or a mold kept under pressure are the devices used as the vessel. The mold may be kept under pressure in a hydraulic press or by equivalent pressure means.

Where an autoclave is used the mixture may be treated therein for instance, in sheet form, care being taken to prevent the material from spreading in the autoclave. Where more delineated contours are wanted the use of molds or forms in the autoclave is recommendable.

Instead of using an autoclave, vulcanization presses may be used in combination with a mold providing the containing vessel, which mold is heated and kept under a certain pressure by the press. A mold of this kind is illustrated by way of example in Fig. 2 in which $a$ designates the mold and $b$ the cover which may be formed of an aluminum plate.

The temperature at which the vulcanization step is carried out depends entirely on the composition of the crude mix and can be ascertained easily by any one skilled in the art. As to the temperature at which gas is evolved, it depends on the particular substance used and as a rule it is indicated by the suppliers of the gas-evolving substance.

In large-scale practice and depending on the results aimed at, the method may be carried into effect on less strict lines in order to lead to the formation of globular cells. In some instances it is even possible to obtain open cells, notably in the superficial layers, in order to facilitate the anchoring of a plaster coating applied on the surface of the cellular body.

*Example.*—A rubber mix is prepared as follows:

100.0 parts of masticized rubber
1.5 parts of stearic acid
5.0 parts of zinc oxide
10.0 parts of sulphur and
.4 parts of oxyphenyl-guanidine With the mix is incorporated, as a gas-evolving agent, 12 parts of finely powdered azo-isobutyric acid dinitrile and the whole is kneaded into a highly homogeneous mixture in such manner that only the unavoidable amount of air is included therein.

A mold, as illustrated in Fig. 1, is filled with 34 grams of this mixture whereafter the mold provided with its cover is held under a pressure of 20 tons in a press heated to a temperature of 110° C. for 15 minutes.

Figure 4:
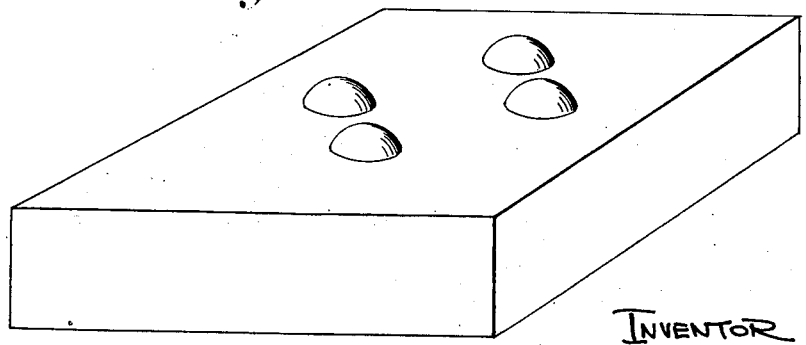
Figure 4 is a perspective view of a molded product produced in the mold of Figure 2.

The press is then allowed to cool so as to bring the mixture back to a temperature of about 20° C., whereafter the pressure is released. The mold is opened and the rudimentary cellular body stripped therefrom. Said body is allowed to rest for about 10 minutes at normal temperature and pressure. From that body a 10 x 10 cm. piece is cut out which is put into the mold shown in Fig. 2 in which $a$ designates the mold proper and $b$ the lid thereof. The mold is then heated to a temperature of about 140° C. under a pressure of 10 kg./cm.$^2$ in a vulcanization press. Following this, the temperature is brought back to 20° C. and the pressure released, whereafter the body shaped as shown in Fig. 4 is stripped; said body is light in weight and formed with closed polyhedral cells separated by very thin plane or curved partitions of uniform thickness.

In the following claims, the word "rubber" is intended to include all kinds of natural and artificial elastomers.

I claim:

1. In a method for producing cellular rubber products having a closed polyhedral cell formation, the steps of forming a homogeneous rubber mix containing a vulcanizing agent and a gas blowing agent, placing said mix in a confined space and exerting pressure externally on said mix in said space, heating said mix to generate gas from said gas blowing agent and to effect incipient vulcanization of said rubber, whereby a pressure is developed within said mix, then abruptly allowing said mix to expand by reducing the external pressure to a controlled extent with a consequent partial reduction in the pressure within the mix, whereby polyhedrally shaped cells are formed in said mass, and further heating said mass while under sufficient external pressure to preclude further expansion, to effect further vulcanization of the rubber to fix the shape of said polyhedral cells therein.

2. In a method for producing cellular rubber products having a closed polyhedral cell formation, the steps of forming a homogeneous rubber mix containing a vulcanizing agent and a gas blowing agent, placing said mix in a confined space and exerting pressure externally on said mix in said space, heating said mix to generate gas from said gas blowing agent and to effect incipient vulcanization of said rubber, whereby a pressure is developed within said mix, then abruptly allowing said mix to expand about 10% by volume by reducing the external pressure to a controlled extent with a consequent partial reduction in the pressure within the mix, whereby polyhedrally shaped cells are formed in said mass, and further heating said mass while under sufficient external pressure to preclude further expansion, to effect further vulcanization of the rubber to fix the shape of said polyhedral cells therein.

3. In a method for producing cellular rubber products having a closed polyhedral cell formation, the steps of forming a homogeneous rubber mix containing a vulcanizing agent and a gas blowing agent, placing said mix in a confined space and exerting pressure externally on said mix in said space, heating said mix to generate gas from said gas blowing agent and to effect incipient vulcanization of said rubber, whereby a pressure is developed within said mix, then abruptly allowing said mix to expand by reducing the external pressure to a controlled extent with a consequent partial reduction in the pressure within the mix, whereby polyhedrally shaped cells are formed in said mass, further heating said mass while under sufficient external pressure to preclude further expansion, to effect further vulcanization of the rubber to fix the shape of said polyhedral cells therein, allowing the mass to cool, releasing it from pressure and thereafter heating said mass to conclude the vulcanization thereof.

4. In a method for producing cellular rubber products having a closed polyhedral cell formation, the steps of forming a homogeneous rubber mix containing a vulcanizing agent and a gas blowing agent, placing said mix in a confined space and exerting pressure externally on said mix in said space, heating said mix to generate gas from said gas blowing agent and to effect incipient vulcanization of said rubber, whereby a pressure is developed within said mix, then abruptly allowing said mix to expand by reducing the external pressure to a controlled extent with a consequent partial reduction in the pressure within the mix, whereby polyhedrally shaped cells are formed in said mass, further heating said mass while under sufficient external pressure to preclude further expansion, to effect further vulcanization of the rubber to fix the shape of said polyhedral cells therein, allowing the mass to cool, releasing it from pressure and thereafter heating said mass under pressure to conclude the vulcanization thereof.

5. In a method for producing cellular rubber products having a closed polyhedral cell formation, the steps of forming a homogeneous rubber mix containing a vulcanizing agent and as a gas blowing agent, a member of the group consisting of diazoaminobenzene and azo-isobutyric acid dinitrile, placing said mix in a confined space and exerting pressure externally on said mix in said space, heating said mix to generate gas from said gas blowing agent and to effect incipient vulcanization of said rubber, whereby a pressure is developed within said mix, then abruptly allowing said mix to expand by reducing the external pressure to a controlled extent with a consequent partial reduction in the pressure within the mix, whereby polyhedrally shaped cells are formed in said mass, and further heating said mass while under sufficient external pressure to preclude further expansion, to effect further vulcanization of the rubber to fix the shape of said polyhedral cells therein.

PASCAL J. CARPENTIER.

REFERENCES CITED

The following references are of record in the file of this patent:

UNITED STATES PATENTS

| Number | Name | Date |
| --- | --- | --- |
| 1,345,904 | Wishart | July 6, 1920 |
| 2,283,316 | Cooper | May 19, 1942 |
| 2,363,051 | Dosmann | Nov. 21, 1944 |

OTHER REFERENCES

Ser. No. 314,347, Ricard (A. P. C.), published June 1, 1943.